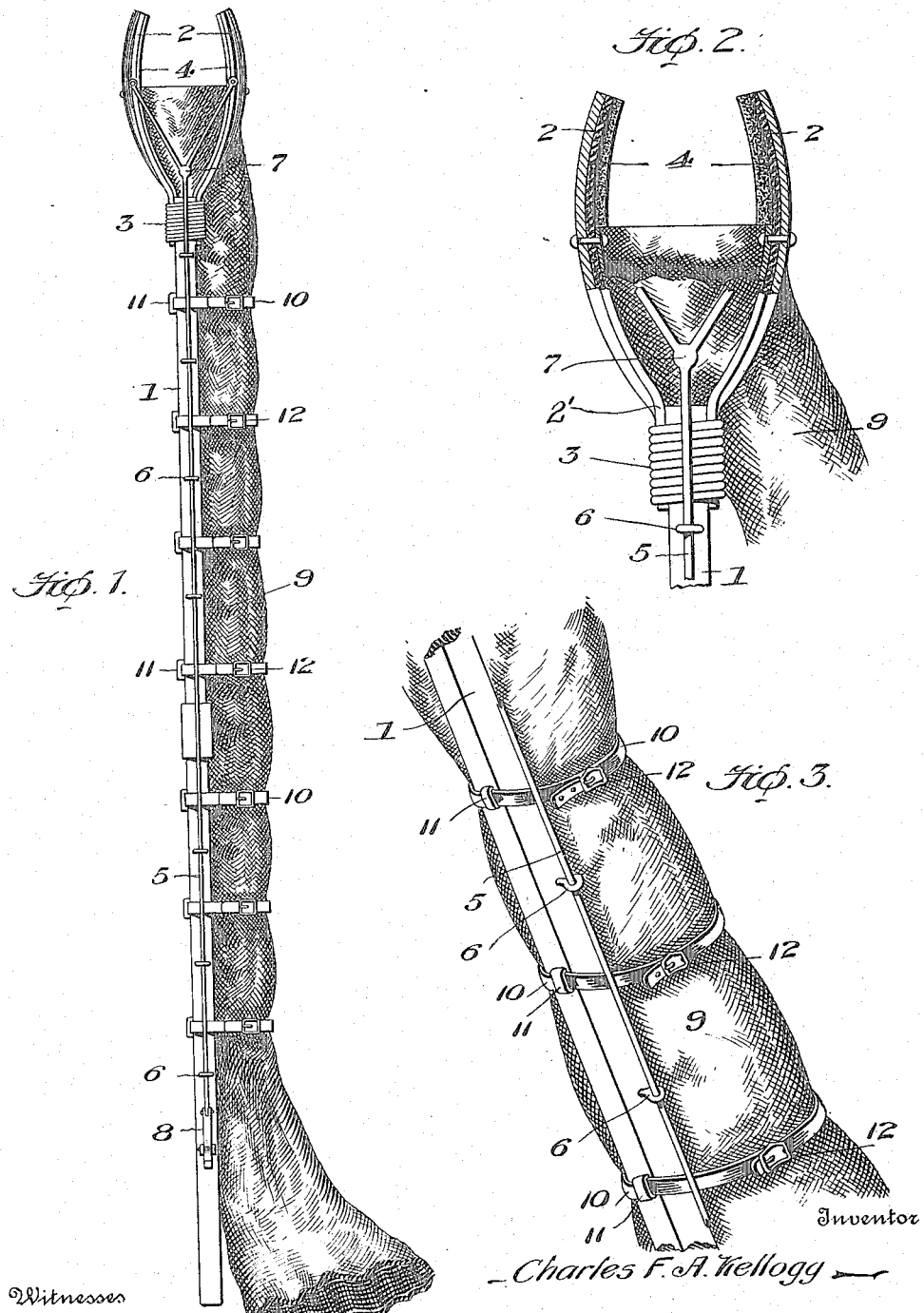

UNITED STATES PATENT OFFICE.

CHARLES F. A. KELLOGG, OF GLOSTER, MISSISSIPPI.

FRUIT-PICKER.

1,133,381.      Specification of Letters Patent.      Patented Mar. 30, 1915.

Application filed August 7, 1913. Serial No. 783,588.

*To all whom it may concern:*

Be it known that I, CHARLES F. A. KELLOGG, a citizen of the United States, residing at Gloster, in the county of Amite and State of Mississippi, have invented certain new and useful Improvements in Fruit-Pickers; and I do declare the following to be a full, clear, and exact description of the invention, such as will enable others skilled in the art to which it appertains to make and use the same.

This invention relates to improvements in fruit pickers.

One object of the invention is to provide a fruit picker having an improved construction and arrangment of gripping jaws whereby the fruit may be grasped and removed from the branch without detaching or breaking the stem from the fruit.

Another object is to provide a fruit picker having improved adjustable means for receiving and conveying the fruit of different sizes from the picking jaws to the ground or to a suitable receptacle without bruising or injuring the fruit.

A further object is to provide a fruit picker which will be simple, strong, durable and inexpensive in construction, efficient and reliable in operation and which may be readily manipulated among the thick branches of a tree.

With these and other objects in view, the invention consists of certain novel features of construction, and the combination and arrangement of parts as will be more fully described and claimed.

In the accompanying drawings: Figure 1 is a side view of my improved fruit picker; Fig. 2 is an enlarged side view of the upper end and the fruit engaging jaws of the picker, parts being broken away and in section; Fig. 3 is an enlarged detail perspective view of a portion of the pole and conveyer of the picker showing the manner in which the fruit retracting bands are adjusted for picking fruit of different sizes.

My improved fruit picker comprises a pole 1, which is preferably constructed of a series of detachably connected sections or lengths whereby the length of the pole may be varied. Secured to the upper end of the pole are picking jaws 2 which are preferably formed of slightly curved spring metal plates which render the same yielding, the inner ends of which are firmly secured to the opposite sides of the end of the pole preferably by means of a wire strand in the form of a coil 3 arranged on said end of the pole as shown and encircling the integrally formed shanks 2'. The plates or jaws 2 are preferably provided with a lining 4 formed of any suitable soft material which will prevent the jaws from bruising the fruit when engaged therewith.

When in a normal position the outer ends of the jaws are spaced apart a sufficient distance to be passed over a fruit to be picked and in order to bring the jaws into engagement with the fruit for removing the same from the branch, I provide a jaw operating mechanism comprising a wire 5 which extends along the length of the pole 1 and is held in sliding engagement therewith by eyes or rings 6 as shown. The outer yielding end of the jaw operating wire 5 is bifurcated or branched as at 7 and said branched ends of the wire are pivotally secured to one edge of the jaws 2 whereby when the wire is pulled inwardly the branched ends thereof will draw the jaws into gripping engagement with the fruit whereupon by a proper manipulation of the pole the fruit may be readily removed from the branch without breaking or detaching the stem from the fruit. The inner end of the jaw operating rod or wire 5 is connected to a handle or lever 8 which is pivotally attached to one side of the pole 1 near the inner end thereof or within convenient reach of the operator, who by pulling downwardly or inwardly on the handle may close the jaws over the fruit in the manner described.

In order to catch and conduct the picked fruit to the ground or to a suitable receptacle without bruising the fruit, I provide a conveyer 9 which is in the form of a tube or chute formed of fabric or other suitable flexible material and which may extend for a suitable distance beyond the inner end of the pole as shown. The tube or chute 9 is secured at short intervals to the pole 1 by a series of elastic bands 10 which are connected to the pole in any suitable manner but are here shown as being fastened thereto by staples 11 through which the bands pass. The bands 10 also serve as means for retarding or checking the fall of the fruit through the conveyer tube thus obviating any danger of the fruit being bruised by falling rapidly through the conveyer and striking the ground or bottom of the receptacle with which the lower end of the tube is connected. In order to facilitate the checking or retarding action of the bands 10 when fruit of different sizes is to be picked, said bands are made adjustable in any manner, but preferably by means of a buckle 12 secured to one end of the bands and adapted to be engaged by the opposite end whereby the bands may be taken up to the desired extent. By carefully adjusting the bands with respect to the average size of the fruit to be picked an opening may be formed or the size of the conveyer tube reduced to such an extent as to prevent the passage of the fruit through the conveyer at points engaged by the bands until the latter are stretched, or in other words, the resistance of the bands is such that the weight of one fruit alone will not be sufficient to stretch the bands far enough to permit the fruit to pass, so that the latter will thus be held by the band until the next fruit is picked and drops onto the fruit which is held, whereupon the combined weight of the two fruits will expand or stretch the band and permit the lower fruit to pass the same. The fruit when thus forced through or past the band will drop through the conveyer chute or tube until caught by the next band, through which it will be forced by the pressure of the next fruit dropped thereon in the manner described. By this arrangement it will be seen that the successive fruits are retarded or checked in their passage through the tube or conveyer and by arranging the bands at suitable distances apart the fruit dropping from one band to the other will not fall heavy enough to bruise or injure the same.
From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as claimed.

Having thus described my invention, what I claim is:

A device of the character set forth comprising a pole, oppositely disposed resilient jaws connected to one extremity thereof and extending longitudinally therefrom, said jaws being arcuate shaped longitudinally and dished transversely to substantially conform to the contour of the fruit, shanks integrally formed on the lower ends of said jaws, the former being curved transversely to conform to the shape of the pole whereby said jaws may be disposed in substantially parallel relationship upon the latter and a wire coil encircling said shanks to secure the latter to said pole, an operating wire bifurcated at one extremity to form converging arms, the free ends of the latter being pivoted to said jaws to contract the same upon actuation of said operating wire, and a conveyer connected to said jaws intermediate their ends substantially as and for the purpose set forth.

In testimony whereof I have hereunto set my hand in presence of two subscribing witnesses.

CHARLES F. A. KELLOGG.

Witnesses:
J. D. ROBERTS,
GUY E. FORMAN.

Copies of this patent may be obtained for five cents each, by addressing the "Commissioner of Patents. Washington, D. C."